United States Patent [19]

Salcedo

[11] Patent Number: 4,532,569
[45] Date of Patent: Jul. 30, 1985

[54] METHOD AND APPARATUS FOR DETECTING IMPROPER POLARITY IN A POWER DISTRIBUTION SYSTEM

[75] Inventor: Javier F. Salcedo, North Hollywood, Calif.

[73] Assignee: ABCO Hardware and Builders Supply, Inc., Lynwood, Calif.

[21] Appl. No.: 476,368

[22] Filed: Mar. 17, 1983

[51] Int. Cl.³ .............................................. H02H 3/26
[52] U.S. Cl. ....................................... 361/76; 361/77; 361/84; 307/127
[58] Field of Search ........................ 361/76, 77, 82, 84, 361/88, 46, 50, 42; 307/127

[56] References Cited

U.S. PATENT DOCUMENTS

| 1,646,028 | 10/1927 | Lewis et al. | |
| 2,628,999 | 2/1953 | Bruyne | 175/183 |
| 2,922,925 | 1/1960 | Gerrard | 317/9 |
| 3,551,749 | 12/1970 | Hore | 317/48 |
| 3,944,891 | 3/1976 | McDonald et al. | 361/77 |
| 4,163,270 | 7/1979 | Marus | 316/77 |
| 4,196,378 | 4/1980 | Shirai | 318/438 |

Primary Examiner—Reinhard J. Eisenzopf
Attorney, Agent, or Firm—Fulwider, Patton, Rieber, Lee & Utecht

[57] ABSTRACT

A power distribution apparatus, and related method, for coupling single-phase power from a three-wire input line to a power outlet only when the ac power signals carried on the input line have the correct polarity. Particular wires of the three-wire input line are designated to carry a positive power signal, a neutral power signal, and a negative power signal, with the positive and negative power signals having opposite polarities. The apparatus detects the voltage difference between the power signals carried on the two wires designated to carry the positive and negative power signals and couples power to the power outlet only when the detected voltage difference exceeds a prescribed threshold. Since the detected voltage difference exceeds the threshold only when the polarities of the power signals on the input line are correct, the system prevents the coupling of incorrect voltage levels to the power outlet and thus eliminates electrical shock hazards of this kind.

12 Claims, 2 Drawing Figures

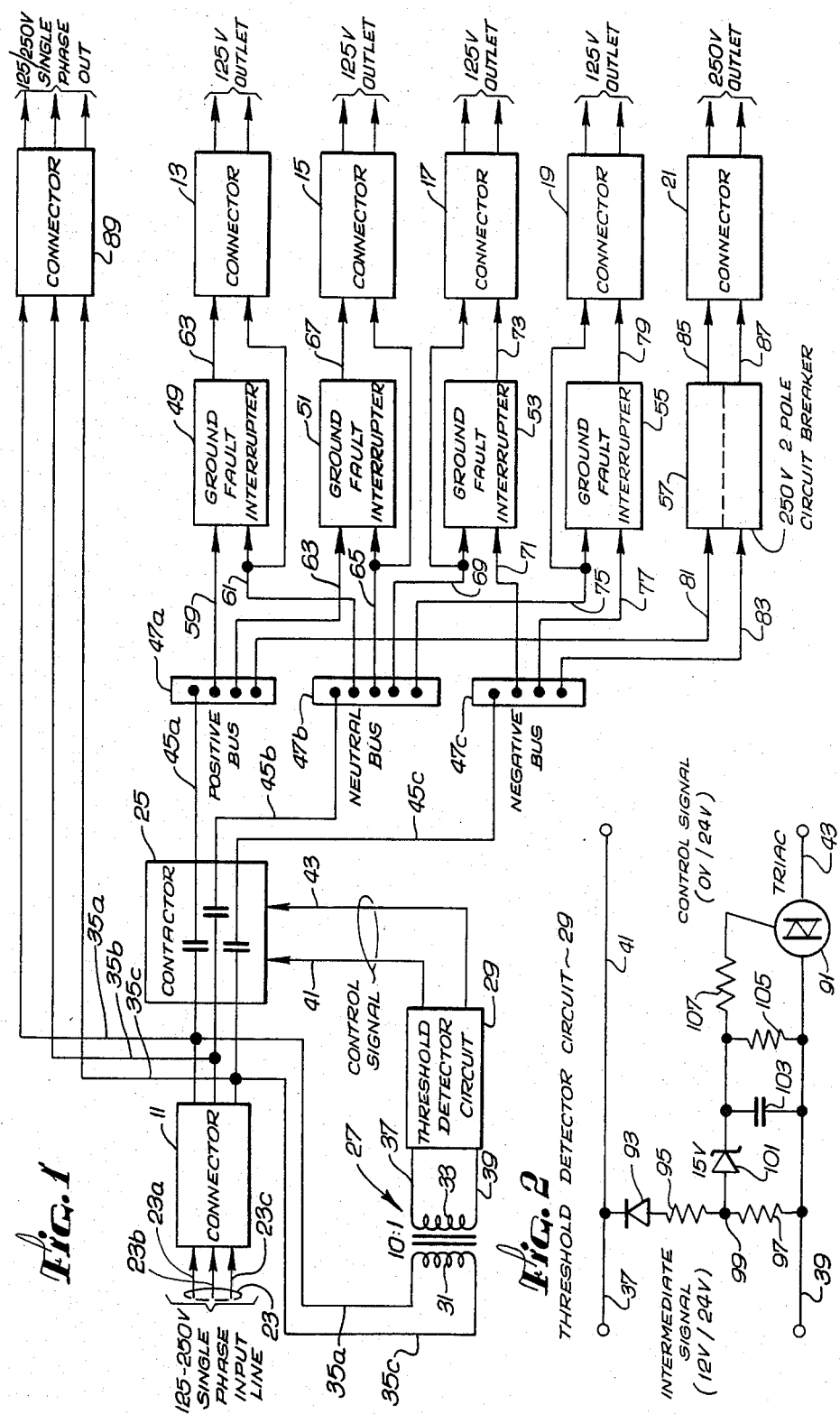

METHOD AND APPARATUS FOR DETECTING IMPROPER POLARITY IN A POWER DISTRIBUTION SYSTEM

BACKGROUND OF THE INVENTION

This invention relates generally to single-phase, three-wire power distribution systems, and, more particularly, to systems of this kind having means for detecting an improper polarity in the power signals carried on the three wires.

Power distribution systems of this general type are commonly used at construction sites to supply power to portable tools and the like. These systems ordinarily receive single-phase power on a three-wire line, which carries a positive power signal, a neutral power signal and a negative power signal, with the positive and negative power signals having opposite polarities. The system includes a number of standard ground fault interrupters and associated outlet connectors for providing protected output power.

Occasionally, the three-wire line supplying power to the system can be accidentally severed. When this occurs, personnel at the site will ordinarily attempt to reconnect the line, but a hazard can arise if they fail to correctly match up the severed wires. For example, if the wires ordinarily carrying the positive power signal and neutral power signal are reversed, some of the system's outlet connectors will supply double voltage levels.

It should therefore be appreciated that there is a need for a power distribution system having means for sensing such an incorrect polarity in a single-phase, three-wire power input line, and for uncoupling power from a number of outlet connectors when that occurs. The present invention provides a simple, low-cost and extremely reliable solution to that need.

SUMMARY OF THE INVENTION

The present invention is embodied in a power distribution apparatus, and a related method, for receiving single-phase power on a three-wire input line and coupling it to a power outlet. The three-wire input line carries positive, neutral and negative ac power signals, with the positive and negative power signals having opposite polarities. In accordance with the invention, the apparatus includes fault detection means for detecting the voltage difference between the power signals carried on two predetermined wires of the three-wire input line and for producing a prescribed control signal indicating whenever the detected voltage difference exceeds a prescribed threshold. In addition, the apparatus includes contactor means for coupling single-phase ac power from the three-wire input line to the power outlet only when the control signal coupled from the fault detection means indicates that the detected voltage difference exceeds the prescribed threshold. Since the detected voltage difference exceeds the threshold only when the polarity of the three-wire input line is correct, the apparatus prevents the distribution of improper voltage levels to the power outlet and thereby significantly reduces electrical shock hazards. The apparatus is relatively low in cost, yet extremely reliable in preventing such hazards.

More particularly, the apparatus is especially suitable for receiving 60 hertz, 125/250-volt input power and distributing it as 125 volt or 250 volt power to a plurality of two-wire outlet connectors. In this case, the positive and negative power signals supplied on two wires of the three-wire input line are both 125-volt signals, but with opposite polarities. The neutral power signal is zero volts. The apparatus couples power to the outlet connectors only when the positive and negative power signals are carried on two particular wires of the three-wire input line.

The fault detection means preferably includes step-down transformer means having a primary winding and a secondary winding, with the power signals carried on the two wires designated for the positive and negative power signals being coupled to the primary winding. A special intermediate signal having an ac voltage proportional to the voltage difference between these two power signals is thereby supplied by the secondary winding. The fault detection means further includes threshold detector means for detecting the ac voltage of the intermediate signal and producing the control signal whenever the detected voltage exceeds a prescribed threshold. In the preferred embodiment, this prescribed threshold is selected to be at a level midway between the voltage that would be produced when the positive and negative power signals are applied to the primary winding and the voltage that would be produced when either the positive and neutral power signals or the negative and neutral power signals are applied to the primary winding.

In the preferred embodiment, the control signal produced by the threshold detector means is a single-phase ac signal that is substantially the same as the intermediate signal whenever the intermediate signal voltage exceeds the threshold and that is substantially zero volts whenever the intermediate signal voltage does not exceed the threshold. In addition, the threshold detector means includes series-connected switch means and means for actuating the switch means whenever the ac voltage of the intermediate signal exceeds the prescribed threshold.

Other aspects and advantages of the present invention should become apparent from the following description of the preferred embodiment, taken in conjunction with the accompanying drawings, which illustrate, by way of example, the principles of the invention.

BRIEF DESCRIPTION OF THE DRAWINGS

FIG. 1 is a simplified block diagram of a power distribution apparatus that detects an improper polarity in single-phase ac power supplied on a three-wire input line; and FIG. 2 is a schematic diagram of the threshold detector circuit included in the apparatus of FIG. 1.

DESCRIPTION OF THE PREFERRED EMBODIMENT

Referring now to the drawings, and particularly to FIG. 1, there is shown a block diagram of a power distribution apparatus for receiving single-phase, 125/250-volt power at a three-terminal inlet connector 11 and distributing it to a number of two-terminal outlet connectors 13, 15, 17, 19 and 21. The single-phase power is supplied to the inlet connector on a three-wire input line 23, which includes wires 23a, 23b and 23c. The power signals carried on these respective wires include a 125-volt ac positive power signal, a zero-volt neutral power signal, and a 125-volt ac negative power signal. The positive and negative power signals have opposite polarities to each other.

In accordance with the invention, the apparatus includes a contactor 25 that relays power to the outlet connectors 13 through 21 only when the respective positive, neutral and negative power signals are supplied to the apparatus on their appropriate wires 23a, 23b, and 23c. In this way, the possibility of supplying incorrect voltage levels to the outlet connectors is prevented, and electrical shock hazards of this kind are eliminated.

For use in controlling the contactor 25, the apparatus includes a transformer 27 and a threshold detector circuit 29. These two elements detect the voltage difference between the power signals supplied to the apparatus on the input wires 23a and 23c, and couple a prescribed control signal to the contactor indicating when the detected voltage difference exceeds a prescribed threshold. The two input wires 23a and 23c are designated to carry the positive and negative power signals, in which case the voltage difference is 250 ac. However, if the input line 23 is incorrectly wired, such that the two input wires 23a and 23c carry some other combination of power signal, the voltage difference is a maximum of 125 volts ac.

More particularly, transformer 29 is a step-down transformer having a turns ratio of about 10:1, and it includes a primary winding 31 and a secondary winding 33. The two terminals of the inlet connector 11 that are designated for carrying the positive and negative input power signals are connected to the primary winding on lines 35a and 35c, and an intermediate signal having a corresponding ac voltage, but proportionately reduced in magnitude, is produced by the secondary winding. This intermediate signal is coupled on lines 37 and 39 to the threshold detector circuit 29.

The threshold detector circuit 29 detects the ac voltage of the intermediate signal and couples an appropriate control signal on lines 41 and 43 to the contactor 25 indicating whenever the detected voltage exceeds a prescribed threshold. The threshold is selected such that the detected voltage exceeds it only when the positive and negative power signals are supplied on the two designated wires 23a and 23c. The control signal is substantially identical to the intermediate signal whenever the detected signal exceeds the threshold. Thus, since the transformer 27 has a turns ratio of 10:1, the control signal amplitude is about 24 volts whenever the polarity of the input power is correct. When the detected voltage fails to exceed the threshold, the threshold detector circuit outputs a zero-volt control signals on lines 41 and 43.

The contactor receives power from the inlet connector 11 on lines 35a, 35b and 35c. It includes three poles and has a coil responsive to a 24-volt, 60 hertz control signal input. Whenever such a control signal is supplied to it on lines 41 and 43, its three switches are closed, and it outputs single-phase, 125/250-volt power on wires 45a, 45b and 45c.

The contactor 25b relays single-phase power on lines 45a, 45b and 45c to positive, neutral and negative power buses 47a, 47b and 47c, respectively. The buses, in turn, supply single-phase power to the two-wire outlet connectors 13, 15, 17 and 19 through four 125 volt ground fault interrupters 49, 51, 53 and 55, respectively, and to the two-wire outlet connector 21 through a 250 volt, two-pole circuit breaker 57.

In particular, the first ground fault interrupter 49 receives the positive power signal on line 59 from the positive bus 47a and the neutral power signal on line 61 from the neutral bus 47b. It relays the positive signal on line 63 to the first outlet connector 13, while the neutral signal is supplied directly to the connector on line 61. Similarly, the second ground fault interrupter 51 receives the positive and neutral power signals on lines 63 and 65, respectively, and relays the positive signal on line 67 to the second outlet connector 15, while the neutral signal is supplied directly to the connector on line 65. The third ground fault interruptor 53 receives the neutral and negative power signals on lines 69 and 71, respectively, and relays the negative signal to the third outlet connector 17 on line 73, while the neutral signal is coupled directly to the connector on line 69. The fourth ground fault interrupter 55 receives the neutral and negative power signals on lines 75 and 77, respectively, and relays the negative signal to the fourth outlet connector 19 on line 79, while the neutral signal is coupled directly to the connector on line 75. Finally, the 250-volt circuit breaker 57 receives the positive and negative power signals on lines 81 and 83, respectively, and relays them both to the 250-volt outlet connector 21 on lines 85 and 87, respectively.

The apparatus of FIG. 1 further includes a single-phase, 125/250-volt three-wire outlet connector 89 for outputing unprotected power directly from the inlet connector 11. The power is coupled between the connectors on lines 35a, 35b and 35c. The outlet connector 89 supplies power whether or not the transformer 27 and threshold detector circuit 29 detect an improper polarity in the power input line 23.

Referring now to FIG. 2, there is shown a schematic circuit diagram of the threshold detector circuit 29 of FIG. 1. It receives the intermediate signal supplied on lines 37 and 39 from the secondary winding 33 of the transformer 27, and supplies the control signal on lines 41 and 43 to the contactor 25. The circuit directly couples the input line 37 to the output line 41, and couples the other input line 39 to the other output line 43 through a triac 91. The triac is switched on whenever the detected voltage level of the intermediate signal exceeds a prescribed threshold selected to be between 12 volts and 24 volts.

The threshold detector circuit 29 includes a conventional half-wave rectifier that includes a diode 93 and series resistors 95 and 97 connected between the input lines 37 and 39. The signal at the node 99 between the two resistors is therefore a series of half-sine wave pulses having a peak amplitude of slightly less than about 24 volts, if the input line 23 has the correct polarity, and slightly less than about 12 volts, if the input line has incorrect polarity. A peak detector, including a series-connected 15-volt zener diode 101 and shunt capacitor 103 and resistor 105, measures the peak voltage at the node 99. The detected voltage stored on the capacitor is coupled through a resistor 107 to the gate terminal of the triac 91. Sufficient current is provided through the zener diode to charge the capacitor and trigger the triac only if the peak voltage at the node exceeds about 15 volts, which occurs only when the polarity of the input line is correct.

In operation, if the ac voltage of the intermediate signal supplied to the threshold detector circuit 29 is about 24 volts, as would occur when the polarity of the three-wire input line 23 is correct, a voltage of about eight to nine volts would be present on the capacitor 95.

This voltage would be sufficient to turn on the triac 91 and generate the 24-volt ac control signal for coupling on lines 41 and 43 to the contactor 25. On the other hand, if the polarity of the three-wire input line 23 is for some reason incorrect, such that one of the two wires 23a or 23c carries the neutral power signal, the intermediate signal will have an ac voltage level of only about 12 volts. Such a voltage would provide insufficient current through the zener diode 99 to charge the capacitor and trigger the triac. A control signal of zero volts would therefore be produced and the contactor 25 would remain open.

It should be appreciated from the foregoing description that the present invention provides an effective apparatus for distributing single-phase power only when the polarity of a single-phase, three-wire input line is correct. The apparatus is particularly adapted for distributing power received on an input line carrying a 125-volt positive power signal, a zero-volt neutral power signal, and a 125-volt negative power signal, with the positive and negative power signals having opposite polarities. The apparatus detects the voltage difference between the power signals carried on two predetermined wires of the three-wire input line, which are designated to carry the positive and negative power signals. If the detected voltage difference fails to exceed a prescribed threshold, indicating that one of the two power signals is not present and that the polarity is therefore incorrect, the apparatus uncouples power from a number of power outlet connectors. The apparatus includes a minimum of elements and operates in an extremely reliable fashion.

Although the present invention has been described in detail with reference to the presently-preferred embodiment, it should be understood by those of ordinarily skill in the art that various modifications can be made without departing from the invention. Accordingly, the invention is limited only by the following claims.

I claim:

1. Power distribution apparatus for coupling single-phase power from a three-wire input line to a power outlet only if prescribed positive, neutral and negative ac power signals are carried on predetermined wires of the three-wire input line, the apparatus comprising:
   fault detection means for detecting the voltage difference between the power signals carried on two predetermined wires of the three-wire input line and for producing a prescribed control signal indicating whenever the detected voltage difference exceeds a prescribed threshold, the fault detection means including transformer means having a primary winding and a secondary winding, the power signals carried on the two predetermined wires of the three-wire input line being coupled to the primary winding and an intermediate signal being produced by the secondary winding, and threshold detector means for comparing the ac voltage of the intermediate signal with a prescribed threshold and producing the control signal in accordance with the outcome of the comparison; and
   contactor means for coupling single-phase ac power from the three-wire input line to the power outlet only when the control signal produced by the fault detection means indicates that the detected voltage difference exceeds the prescribed threshold, whereby power is coupled to the power outlet only when the polarity of the three-wire input line is correct.

2. Power distribution apparatus as defined in claim 1, wherein the control signal produced by the threshold detector means is substantially the same as the intermediate signal whenever the ac voltage of the intermediate signal exceeds the prescribed threshold.

3. Power distribution apparatus as defined in claim 2, wherein the threshold detector means includes series-connected switch means and means for actuating the switch means whenever the ac voltage of the intermediate signal exceeds the prescribed threshold.

4. Power distribution apparatus as defined in claim 1, wherein the transformer means steps down the power signals coupled to its primary winding by a factor of about ten to one, such that the intermediate signal has a voltage about one-tenth that of the difference between the power signals carried on the two predetermined wires of the three-wire input line.

5. Power distribution apparatus as defined in claim 1, wherein the contactor means couples single-phase ac power to a plurality of power outlets whenever the control signal indicates that the detected voltage difference exceeds the prescribed threshold.

6. Power distribution apparatus as defined in claim 1, wherein:
   the positive power signal is a 125-volt ac signal;
   the neutral power signal is a zero-volt signal;
   the negative power signal is a 125-volt ac signal having a polarity opposite that of the positive power signal; and
   the apparatus couples power to the power outlet only when the positive and negative power signals are carried on the two predetermined wires of the three-wire input line.

7. Power distribution apparatus as defined in claim 6, wherein the threshold used by the fault detection means is selected to be intermediate the ac voltage difference detected when the positive and negative power signals are carried on the two predetermined wires and the ac voltage difference detected when the positive and negative power signals are not carried on the two wires.

8. Power distribution apparatus for coupling single-phase power from a three-wire input line to a plurality of two-wire power outlets only if prescribed positive, neutral and negative power signals are carried on predetermined wires of the three-wire input line, wherein the positive power signal is a 125-volt ac signal, the neutral power signal is a zero-volt signal, and the negative power signal is a 125-volt ac signal, the positive and negative power signals having opposite polarities, the apparatus comprising:
   transformer means having a primary winding and a secondary winding, the power signals carried on two predetermined wires of the three-wire input line being coupled to the primary winding and an intermediate signal being produced by the secondary winding, wherein the two predetermined wires are designated to carry the positive and negative power signals;
   threshold detector means for comparing the ac voltage of the intermediate signal with a prescribed threshold and for producing a prescribed control signal indicating whenever the voltage exceeds a prescribed threshold, wherein the control signal is substantially the same as the intermediate signal whenever the voltage of the intermediate signal exceeds the threshold and the control signal is substantially zero volts whenever the voltage of the intermediate signal does not exceed the threshold, and wherein the threshold is selected to be greater than the intermediate signal voltage present when the two predetermined wires of the three-wire input line do not carry the positive and negative power signals, but less than the intermediate signal voltage present when the two predetermined wires do carry the positive and negative power signals;

a plurality of two-wire power outlets; and contactor means for coupling single-phase ac power from the three-wire input line to the plurality of two-wire power outlets only when the control signal received from the threshold detector means indicates that the voltage of the intermediate signal exceeds the prescribed threshold, whereby power is coupled to the power outlets only if the polarity of the three-wire input line is correct.

9. A method for distributing single-phase power from a three-wire input line to a power outlet only if prescribed positive, neutral and negative ac power signals are carried on predetermined wires of the three-wire input line, the method comprising steps of:

detecting the voltage difference between the power signals carried on two predetermined wires of the three-wire input line and producing a prescribed control signal indicating whenever the detected voltage difference exceeds a prescribed threshold, the step of detecting and producing including steps of stepping down the voltage difference between the power signals carried on the two predetermined wires of the three-wire input line, to produce an intermediate signal, and comparing the ac voltage of the intermediate signal with a prescribed threshold, and producing the control signal in accordance with the outcome of the comparison; and coupling single-phase ac power from the three-wire input line to the power outlet only when the control signal produced in the step of detecting and producing indicates that the detected voltage difference exceeds the prescribed threshold, whereby power is coupled to the power outlet only if the polarity of the three-wire input line is correct.

10. A method as defined in claim 9, wherein the control signal produced in the step of comparing and producing is substantially the same as the intermediate signal whenever the ac voltage of the intermediate signal exceeds the prescribed threshold.

11. A method as defined in claim 9, wherein:
the positive power signal is a 125-volt ac signal;
the neutral power signal is a zero-volt signal;
the negative power signal is a 125-volt ac signal having a polarity opposite that of the positive power signal; and
the method couples power to the power outlet only when the positive and negative power signals are carried on the two predetermined wires of the three-wire input line.

12. A method as defined in claim 11, wherein the prescribed threshold used in the step of detecting and producing is selected to be intermediate the ac voltage difference detected when the positive and negative power signals are carried on the two predetermined wires and the ac voltage difference detected when the positive and negative power signals are not carried on the two wires.

* * * * *